US011776379B2

(12) United States Patent
Reardon et al.

(10) Patent No.: US 11,776,379 B2
(45) Date of Patent: Oct. 3, 2023

(54) NOTIFICATION SYSTEM FOR DETECTING TOOL USAGE

(71) Applicant: Parker-Hannifin Corporation, Cleveland, OH (US)

(72) Inventors: Gregory Reardon, Sagamore Hills, OH (US); David Shannon, Edina, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 17/591,925

(22) Filed: Feb. 3, 2022

(65) Prior Publication Data
US 2022/0262227 A1 Aug. 18, 2022

Related U.S. Application Data

(60) Provisional application No. 63/229,260, filed on Aug. 4, 2021, provisional application No. 63/148,684, filed on Feb. 12, 2021.

(51) Int. Cl.
  *G05B 19/4065* (2006.01)
  *G08B 21/18* (2006.01)
(52) U.S. Cl.
  CPC .................. *G08B 21/18* (2013.01)
(58) Field of Classification Search
  USPC ...... 340/680, 679, 685, 686.6, 691.3, 691.6, 340/693.1, 693.3, 3.32, 3.43, 3.44, 3.53,
(Continued)

(56) References Cited

U.S. PATENT DOCUMENTS

| 10,531,304 | B2 | 1/2020 | Zeiler et al. |
| 2002/0138358 | A1* | 9/2002 | Scheer ................... G06Q 30/06 |
| | | | 705/29 |

(Continued)

FOREIGN PATENT DOCUMENTS

| JP | 6654128 B2 | 2/2020 |
| WO | 2003103024 A2 | 12/2003 |
| WO | 2016/025963 A1 | 2/2016 |

OTHER PUBLICATIONS

One Key, A Comprehensive System for Construction Inventory Management, retrieved online at https://onekey.milwaukeetool.com/, available at least as early as Apr. 14, 2021.

(Continued)

*Primary Examiner* — Daniel Previl
(74) *Attorney, Agent, or Firm* — Renner, Otto, Boisselle & Sklar, LLP

(57) ABSTRACT

A tool notification system for determining tool usage information that would be otherwise unavailable or not easily discoverable by comparing information output by a tool and information obtained from a source. The tool notification system includes a tool operatively coupled to a sensor which may communicate information about the use, location, or other status of the tool to a processing system of the tool notification system. The processing system also receives the information from the source, which may include information about the parts supplied to the tool, the designated location of the tool, or other threshold parameters associated with supplying or using the tool. The processing system is configured to compare the information output from the tool and the information from the source and determine whether a condition is met for thereby sending a notification about tool usage.

20 Claims, 7 Drawing Sheets

(58) Field of Classification Search
USPC .................. 340/825.23, 825.26, 825.27
See application file for complete search history.

(56) References Cited

U.S. PATENT DOCUMENTS

| | | | |
|---|---|---|---|
| 2010/0023156 A1* | 1/2010 | Trepina | G05B 19/406 700/177 |
| 2010/0124926 A1* | 5/2010 | Klatt | H04W 36/22 455/435.2 |
| 2010/0326156 A1 | 12/2010 | Hoskins et al. | |
| 2012/0007748 A1* | 1/2012 | Forgues | B24D 13/10 340/870.07 |
| 2013/0098988 A1* | 4/2013 | Ben-Haim | G06Q 20/26 235/375 |
| 2013/0160284 A1 | 6/2013 | Gatz et al. | |
| 2013/0204422 A1* | 8/2013 | Ross | B23P 9/025 700/117 |
| 2016/0036351 A1 | 12/2016 | Kanack et al. | |
| 2018/0131151 A1 | 5/2018 | Chahrour | |
| 2019/0237926 A1* | 8/2019 | Couch | H01R 4/183 |
| 2019/0243333 A1 | 8/2019 | Yoon et al. | |
| 2019/0272569 A1* | 9/2019 | Kanamoto | G05B 19/418 |
| 2020/0238487 A1 | 7/2020 | Kanack et al. | |
| 2021/0192412 A1* | 6/2021 | Krishnaswamy | G06Q 10/06316 |
| 2021/0240145 A1* | 8/2021 | Abbott | B25F 5/001 |

OTHER PUBLICATIONS

Gates GC20 with Gates Cortex Intelligence: Smart + Versatile for Maximum Efficiency in the Factory Field, Oct. 9, 2019.
Milwaukee M18 Force Logic 750 MCM Dieless Crimper, retrieved online at https://milwaukeetool.com/Products/Power-Tools/Electrical-Installation/Crimpers/2877-22, available at least as early as Feb. 23, 2021.
Uniflex Production Crimpers—Brochure, pp. 27-37, retrieved online at https://www.uniflexusa.com/fileadmin/archiv/downloads/katalog/EN/Ed_10-4_01-EN_Productioncrimpers_Web.pdf, available at least as early as Mar. 29, 2021.
Verizon Cat-M1 Enterprise Asset Tracker—Brochure, 2018.
Extended European Search Report issued for corresponding EP Application No. 22155370.4, dated Jul. 5, 2022.

* cited by examiner

NOTIFICATION SYSTEM FOR DETECTING TOOL USAGE

RELATED APPLICATIONS

This application claims the benefit of U.S. Provisional Application No. 63/148,684 filed Feb. 12, 2021, and U.S. Provisional Application No. 63/229,260 filed Aug. 4, 2021, each of which is hereby incorporated herein by reference in its entirety.

TECHNICAL FIELD

The present disclosure relates generally to a system for sending and receiving notifications based on tool operations, and more specifically, relates to correlating tool usage information with supply information to obtain accurate information and send notifications about the status of a tool or correlated supplies.

BACKGROUND

In some industries it is common for a tool to be owned by one party, such as a distributor or manufacturer of the tool, who allows the tool to be used by another party, such as an assembler or other downstream-user, that makes product with the tool when needed, rather than traveling to the distributor or manufacturer's location for obtaining such product. This type of tool leasing arrangement can increase productivity for the assembler, and consequently increases sales of consumable parts for the distributor or manufacturer.

An example of an industry where such tool leasing is common practice is in the making of hose assemblies using a crimping tool. The crimping tool is a machine that performs a swaging or crimping operation that involves forcing a die-set around a fitting that has been loosely assembled onto the end of a hose. The crimping tool reduces the size of the fitting to adequately squeeze the hose end and provide a permanent connection. The crimping tool is often a costly machine that is loaned by the distributor or tool manufacturer to the hose assembler, who may consume hundreds or thousands of fittings and hose sections over a period of time.

SUMMARY

One drawback that arises from the type of tool leasing practice described above is that after the tool has been placed at the assembler's location, it becomes impractical for the distributor to monitor the use and/or location of the tool. As a result, the distributor's equipment is susceptible to being misused or underutilized by the assembler.

For example, the assembler may choose to use the tool with consumable parts from another vendor, rather than those that are adapted for use with the tool and provided by the distributor, which may result in faulty assembled parts. As another example, the assembler may give the tool to an unauthorized party at another location for producing unknown parts, which limits the distributor's control over the tool. In both scenarios, the inability to automatically and accurately track tool usage ultimately results in fewer sales of consumable parts by the distributor, and increases the risks of faulty assembled parts in the field.

An aspect of the present disclosure solves one or more problems associated with such tool leasing or similar practices by providing a system that notifies a party when inappropriate tool usage is detected by the system.

According to an aspect, the present disclosure provides a tool notification system or corresponding method, including: a tool configured to process consumable parts; at least one sensor operatively coupled to the tool, the at least one sensor configured to detect at least one property associated with using the tool to process the consumable parts; a communication link operatively coupled to the tool and configured to transmit usage information associated with the at least one property detected by the at least one sensor; a source of supply information associated with supplying the consumable parts for usage by the tool; and a processing system comprising at least one processor that is configured to receive the usage information from the tool via the communication link, and is configured to receive the supply information from the source; wherein the at least one processor of the processing system is configured to compare the usage information to the supply information and determine when the comparison meets or exceeds a predetermined condition, and when the comparison meets or exceeds the predetermined condition, the at least one processor is configured to send a notification.

Because many companies have little framework for monitoring part production when operations are performed in remote locations, which correlates directly to sales, the analysis of sales information after the fact can result in the company spending excess money on a product that has little to no support. Detecting this early would allow a company to decide whether to continue operations on a particular product, or to repurpose their tool to be used with a different party that could lead to an increase in sales of the consumable parts associated with the tool.

Accordingly, in exemplary embodiments, the supply information of the tool notification system may include sales data associated with consumable parts for the tool, and the tool usage information may include part count, in which case the system may compare the number of parts consumed by the tool to the actual sales of parts to determine whether there is inappropriate use of the tool. For example, if the system detects that the tool is consuming many parts but there is a lack of sales of such parts to the party associated with the tool, then this is indicative that the tool is being used with parts that are not specified for use with the tool. Not only does this result in fewer sales to the owner of the tool (e.g., the distributor), but also could result in faulty assemblies susceptible to failure in the field.

The foregoing situation is exemplary, and the tool usage information or the supply information could include various other parameters. For example, the tool usage information could include how many cycles a tool has performed, the pressure, temperature, or vibration values or profiles at which the tool is operating, or the like. Such information allows a tool owner to monitor the tool without being present at the tool operation site, and the result of the correlated data by the system allows information previously difficult or not readily discoverable to be easily obtained.

According to another aspect, a tool notification system or method includes: a tool associated with an identified party; at least one sensor operatively coupled to the tool, the at least one sensor configured to detect at least one property associated with the tool; a communication link operatively coupled to the tool and configured to transmit tool information associated with the at least one property detected by the at least one sensor; a source of identifying information associated with identifying the identified party associated with the tool; a processing system comprising at least one processor that is configured to receive the tool information from the tool via the communication link, and is configured to receive the identifying information from the source; wherein the at least one processor of the processing system is configured to compare the tool information to the identifying information and determine when the comparison meets or exceeds a predetermined condition, and when the comparison meets or exceeds the predetermined condition, the at least one processor is configured to send a notification.

In exemplary embodiments, the tool information may include a location at which the tool is operating and/or a number of tool cycles performed by the assembler, and the identifying information may include a Geo-fence boundary and/or a number of parts or tools supplied to the assembler, in which case the system may compare this information to determine if the tool is misplaced or misappropriated. For example, if the system detects that a threshold number of tool cycles are performed outside of the Geo-fence boundary associated with the authorized user, then the system may notify the distributor of a possible inappropriate use of the tool.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

DETAILED DESCRIPTION

Figure 1:
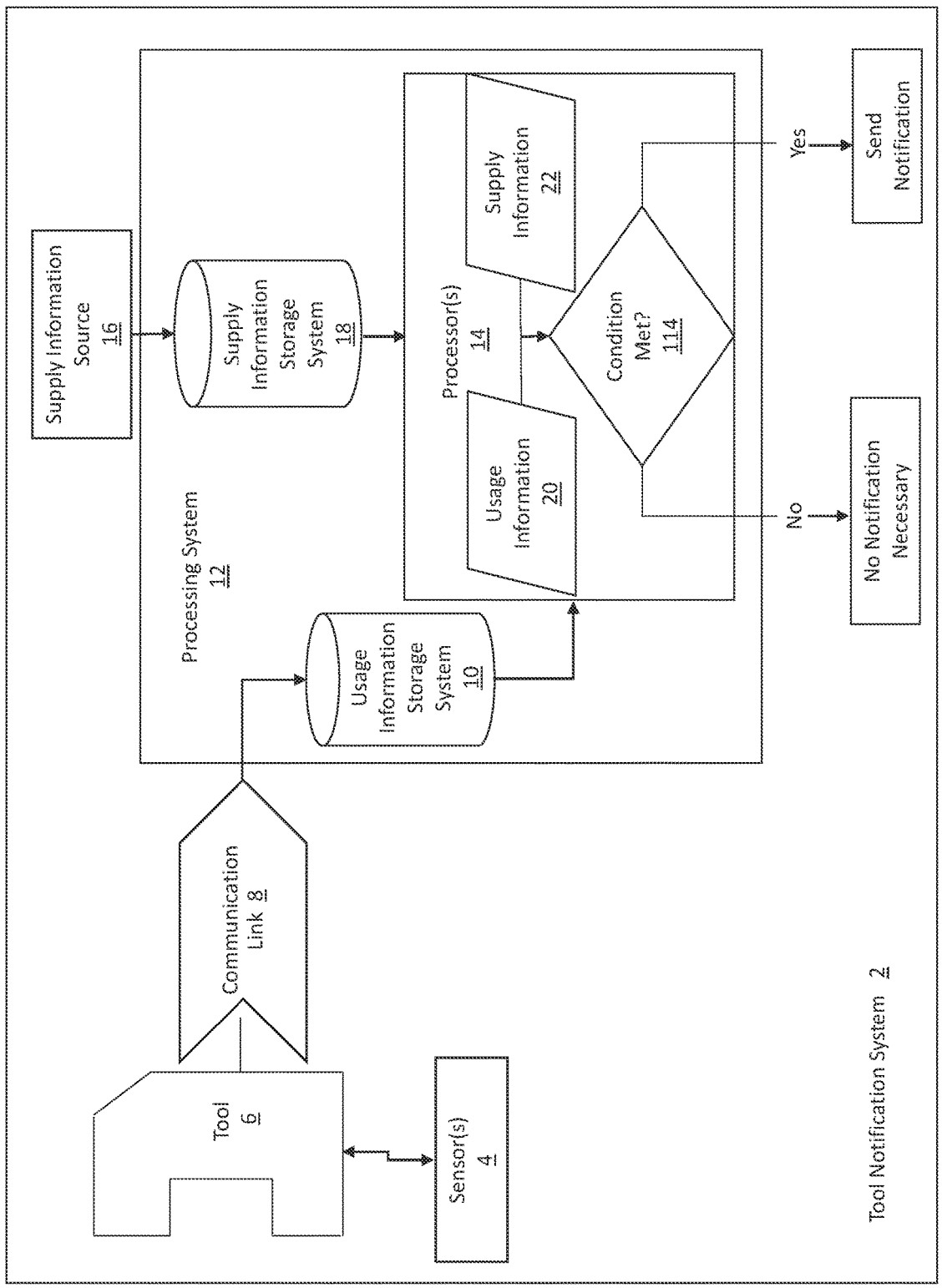
FIG. 1 illustrates an exemplary tool notification system according to an embodiment of the present disclosure.

Embodiments of the present invention will be described below with reference to the drawings, wherein like reference numerals are used to refer to like elements throughout. It is further understood that the referenced drawings are not necessarily to scale and that the invention is not solely limited to the embodiments described below. Other embodiments of the like are possible.

FIG. 1 depicts an exemplary tool notification system 2 according to the present disclosure. As shown, the tool notification system 2 includes a tool 6 that is configured to process consumable parts, and at least one sensor 4 operatively coupled to the tool 6. In the illustrated embodiment, the at least one sensor 4 is configured to detect at least one property associated with using the tool to process consumable parts. A communication link 8 is operatively coupled to the tool 6 and is configured to transmit usage information 20 associated with the at least one property detected by the at least one sensor 4 to a processing system 12. The system 2 also includes a source 16 that provides supply information 22 associated with supplying consumable parts for usage by the tool, which this supply information 22 is communicated to the processing system 12. The processing system 12 includes at least one processor 14 that is configured to receive the usage information 20 from the tool 6 via the communication link 8, and is configured to receive the supply information 22 from the source 16, and is configured to compare the usage information 20 to the supply information 22, and send a notification when a determination is made that the comparison meets or exceeds a predetermined condition.

The tool 6 may be any piece of equipment or implement configured to process parts. In exemplary embodiments, the tool 6 is configured to process consumable parts, which can be any part that is being manufactured, sold, produced, reworked, altered, or used in any process, or any combination thereof. For example, a consumable part may include hoses, flanges, couplers, fittings, filters, or the like. A consumable part also may include parts that process parts, such as chucks, dies, drivers, grinders, sanders, or the like. Additionally, a consumable part may be a chemical used in a process, such as a liquid or combination of liquids, including soap, gas, or the like. The tool 6, for example, may include pneumatic tools, hydraulic tools, electric tools, or the like, such as a crimping tool, riveting tool, driving tool, lathes, etc. Furthermore, the tool 6 is not limited to tools used in a manufacturing setting, the tool 6 may further include any equipment that utilizes consumable parts, for example the tool 6 may include a car wash that consumes chemicals, where the tool 6 would be the car wash and the chemicals would be the consumable part.

The sensor(s) 4 may be any suitable device or electrical circuit, or combination of devices and/or circuits that are suitable for detecting the desired property associated with using the tool. Generally, the sensor(s) will detect a physical or chemical property or change in quantity of such property within its environment, and will convert the information it receives through this detection into an electrical signal as a form of information associated with the detection. The sensor(s) 4 may be operatively coupled to the tool 6 in any suitable manner such that the sensor(s) 4 are capable of detecting the propert(ies) associated with usage of the tool 6. The propert(ies) detected by the sensor(s) 4 may include, for example, temperature, pressure, vibration, flow, cycle counts, location, etc. The at least one sensor 4 may include more than one type of sensor, some or all of which may be the same or may be different. The sensor(s) 4 may be any type of sensor(s) suitable for the application, including but not limited to, a temperature sensor, proximity sensor, pressure sensor, light sensor, color sensor, position sensor, Hall Effect sensor, sound sensor, flow sensor, fluid level sensor, touch sensor, strain and weight sensor, or the like. The usage information 20 associated with the at least one property detected by the sensor(s) 4 may be any form of information, including raw data in the form of a signal (e.g., electrical signal) output from the sensor(s) 4, or post-processed data from such signal which may be processed by suitable circuitry such as a data processor of the tool 6 and/or a data processor downstream of the tool (not shown in the illustrated embodiment).

One or more of the sensor(s) 4 may be configured to be installed directly into the tool 6 or can be operatively coupled to the tool 6, such as by a plugin wired connection or a wireless connection, where applicable. The sensor(s) 4 additionally may receive power from a battery pack. The battery pack may power the tool 6 or may be assigned to the sensor(s) 4 and not the tool 6. This feature is especially useful when the tool 6 does not readily have access to a power supply, such as when the tool is positioned at an offsite location. The sensor(s) 4 can be retrofitted to an already existing tool 6, thus allowing an old tool 6 to be capable of being utilized with the tool notification system 2. Furthermore, it will be appreciated that the tool notification system 2 may utilize sensors already incorporated into the tool 6 (if the tool 6 has already been manufactured) or can be a fully customizable sensor arrangement (not shown in FIG. 1) that may include a plurality of sensors and the previously mentioned battery pack and subsequently attached to an already manufactured tool 6 or a new tool 6 as original equipment. The sensor(s) 4 may also be waterproof and wind-resistant, for example, to allow tool 6 located outside to be capable of withstanding a multitude of weather conditions.

As shown in the illustrated embodiment, the one or more sensors 4 are operatively coupled to the communication link 8. The communication link 8 may include any suitable device or apparatus that enables the usage information 20 obtained from the sensor(s) 4 to be sent to the processing system 12. For example, the communication link 8 may include suitable communication circuitry that allows information transfer utilizing cellular (2G, 3G, 4G/LTE, 5G, etc.), industrial low power wireless (such as 802.15.4, LORA, Simplicity, Zigbee, BLE, Bluetooth, near-field communication (NFC), etc.), industrial fieldbus protocol, Wi-Fi, LAN, satellite, wired connections, or the like. The communication link 8 may be a part of the tool 6 or may be remote from the tool 6 and operatively coupled to the tool 6. In addition, it will also be appreciated that the tool 6 may include similar communication circuitry or functionality as the communication link 8 to communicate data between the communication link 8 and the sensor(s) 4 and/or tool 6 via any data suitable transfer method, such as those previously listed. Flexible configurations for data transfer between the communication link 8 and the sensor(s) 4 and/or tool 6 or the usage information storage system 10 may be particularly advantageous when the tool 6 is located where wired connection is not suitable and wireless connection is suitable, or alternatively, where wireless connection is not suitable and wired connection is suitable. Additionally, the communication link 8 may be also coupled to the sensor(s) 4 directly, such that the usage information 20 obtained from the sensor(s) 4 can be directly sent to the usage information storage system 10 or to the processor(s) 14. This may be especially useful when the tool 6 does not have a method of connecting to the communication link 8, such as for example, an old tool 6 with newly added sensor(s) 4, and thus the sensor(s) 4 will provide a means of communicating with the communication link 8.

As shown in the illustrated embodiment, the usage information 20 from the sensor(s) 4 is sent to a usage information storage system 10 before being sent to the processor(s) 14. The usage information storage system 10 may be any type of storage system that receives information (e.g., data) from communication link 8 and stores this information for a period of time. For example, the usage information storage system 10 may include a non-transitory computer-readable medium, such as hard drives, solid-state drives (SSD), CD/DVD Drives, flash drives, SSD flash drive arrays, hybrid flash arrays, network attached storage (NAS), cloud storage, hybrid cloud storage, random access memory (RAM), a read-only memory (ROM), an erasable programmable read-only memory (EPROM or Flash memory), or any other suitable medium or any combination thereof. As shown the usage information storage system 10 may be a part of the processing system 12, or the usage information storage system 10 could be part of the tool 6, or both. Alternatively or additionally, the usage information storage system 10 could include storage that is remote from the tool 6 and/or the processing system 12, such as standalone storage.

Figure 2:
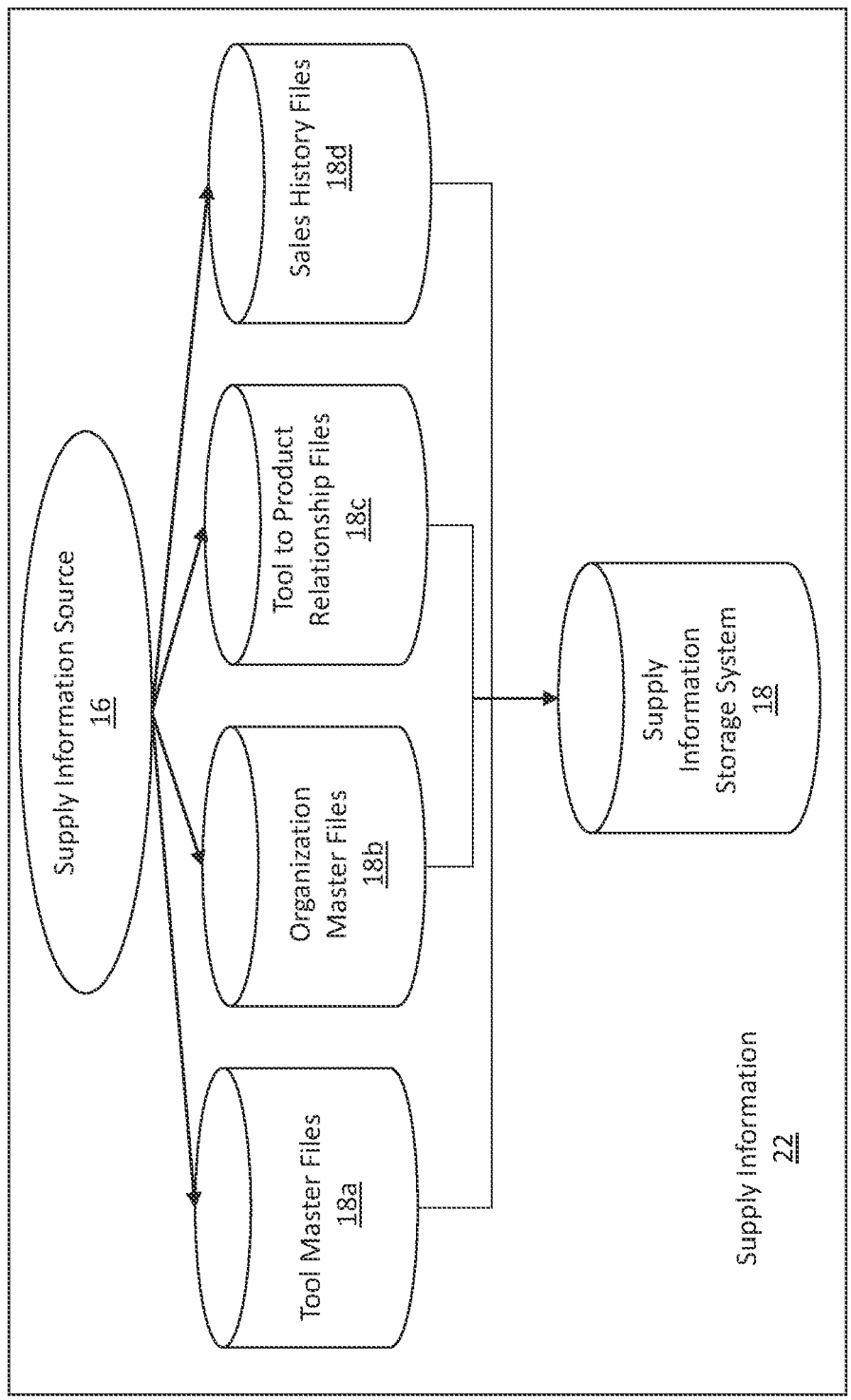
FIG. 2 illustrates an exemplary schematic for supply information to be used with the tool notification system.

The source of supply information 16 may include one or more sources, which may include any suitable apparatus or device having (e.g., storing) or configured to obtain the supply information 22. The supply information 22 may include information related to the consumable parts used by the tool 6, the tool 6 itself, and/or general product information. The supply information 22 may be any form of information, including raw data or processed data. Referring to FIG. 2, examples of the source of supply information 16 is shown in greater detail. As shown, categories of information which collectively make up the supply information 22 may include tool master files 18*a*, organization master files 18*b*, tool product relationship files 18*c*, and/or sales history files 18*d*. The tool master files 18*a* may include tool specifications, usage metrics, sensor associations, quality parameters, tool type, and the like. The organization master files 18*b* may include, identities, locations, roles, tool ownership and authorization to use, product authorization to make or sell, etc. The tool to product relationship files 18*c* may include relationships that are manually entered or discovered through sales to usage patterns or correlation analysis, further discussed later. The sales history files 18*d* may include sales (monetary earnings or losses), sales units, part families, part numbers, customers to whom products are sold, whom a product is sold by, the location or subdivision within an organization where sales are made, or the like. It will be appreciated that the greater the amount of data that is included in the source of supply information 16, the greater the number of correlations that can be determined by the processor(s) 14.

As shown in the illustrated embodiment, the supply information 22 from the source(s) 16 is sent to a supply information storage system 18 before being sent to the processor(s) 14. The supply information storage system 18 may be similar to the usage information storage system 10, as described above, and may include any suitable type of storage system that receives and stores information from the source 16. For example, supply information storage system 18 may include hard drives, solid-state drives (SSD), CD/DVD Drives, flash drives, SSD flash drive arrays, hybrid flash arrays, network attached storage (NAS), cloud storage, hybrid cloud storage, RAM, etc., or the like or with any combination thereof.

Still referring to FIG. 1, the processing system 12 includes the at least one processor 14 that is/are configured to receive the usage information 20 from the tool 6 via the communication link 8, and is configured to receive the supply information 22 from the source 16, whereby the at least one processor 14 can compare the usage information 20 to the supply information 22 and determine when a predetermined condition has been met for sending or not sending a notification, as described in further detail below. In the illustrated embodiment, the usage information 20 is communicated from the sensor(s) 4 via the usage information storage system 10, and the supply information 22 is communicated from the source 16 via the supply information storage system 18, although a direct transfer of information to the processor(s) 14 could be provided. Alternatively or additionally, additional storage systems could be provided, which may be the same type of devices as the storage systems 10 and 20 described above. For example, the usage information 20 and the supply information 22 may be stored outside the processing system 12 in separate storage devices. Alternatively, the processing system 12 may be equipped with its own storage unit or storage units in such a way to allow the processor(s) 14 to communicate with the usage information 20 and supply information 22. Furthermore, it will be appreciated that the usage information 20 and the supply information 22 may be collectively stored in the same storage system and configured to communicate with the processor(s) 14. The communication of such information 20, 22 to the processor(s) 14 may be provided in any suitable way to allow the processor(s) 14 to receive and process the information. Such communication may be provided via any suitable device, such as those described above in connection with the communication link 8.

The processing system 12 may include any suitable apparatus, device(s), or machine(s) (or combinations thereof) that is/are configured to receive and process the usage information 20, the supply information 22, and any other information that may be required for the application. In exemplary embodiments, the one or more processor(s) 14 include processing circuitry that is configured to carry out various processing operations relating to processing and notifications of the system 2. The processing system 12 may include by way of example, a controller, a programmable processor, a computer, or multiple controllers, processors or computers. For example, the processing circuitry may include an electronic processor, such as a CPU, microcontroller or microprocessor. The operative connection(s) of the processing system 12 to the other parts of the system 2 includes those in which signals, physical communications, or logical communications may be sent or received. Typically, such an operative connection includes a physical interface, an electrical interface, or a data interface, but it is to be noted that an operable connection may include differing combinations of these or other types of connections sufficient to allow operable control. The processing system 12 also may include, in addition to hardware, code that creates an execution environment for a program in question. Among their functions, to implement the features described herein, the processing system 12 and/or electronic processor may comprise an electronic controller that may execute program code embodied as the tool notification system control application. It will be apparent to a person having ordinary skill in the art of computer programming, and specifically in application programming for electronic and communication devices, how to program the device to operate and carry out logical functions and instructions associated with the control application. Accordingly, details as to specific programming code have been left out for the sake of brevity. The tool notification system control application may be stored in a non-transitory computer readable medium, such as random access memory (RAM), a read-only memory (ROM), an erasable programmable read-only memory (EPROM or Flash memory), or any other suitable medium. It is understood that although instructions for performing the methods described herein may be executed by the processor components of the processing system 12, such controller or processor functionality could also be carried out via dedicated hardware, firmware, software, or combinations thereof.

In exemplary embodiments, the processing circuitry is configured such that the processor(s) 14 can draw a comparison between the usage information 20 and the supply information 22. The comparison performed by the processor(s) 14 for making the determination(s) may be any suitable calculation, correlation, or the like. It will be appreciated that as more comparisons between the usage information 20 and the supply information 22 are required or discovered, the processor(s) 14 may easily process the new comparisons through the processing circuitry.

As shown at process block 114, the processor(s) 14 include logic for comparing the usage information 20 to the supply information 22 and determining when the comparison meets or exceeds a predetermined condition. Such logic may be programmed into the processor(s) 14. As shown, if the processor(s) 14 determine that a predetermined condition in the comparison between usage information 20 and supply information 22 is met, then a notification may be sent. Alternatively, if the processor(s) 14 determine that the comparison condition is not met, then no notification may be necessary. The notification may be any suitable type of notification, such as for example, a visual notification, audible notification, email, direct message (DM), short message service (SMS), or the like. The notification may be sent to any suitable party (such as to a computer, etc. of the party), which may include the party with the source of supply information 16, the user of the tool 6, another company, or the like. Such notification may include an alert which may indicate that action may be required.

Figure 3:
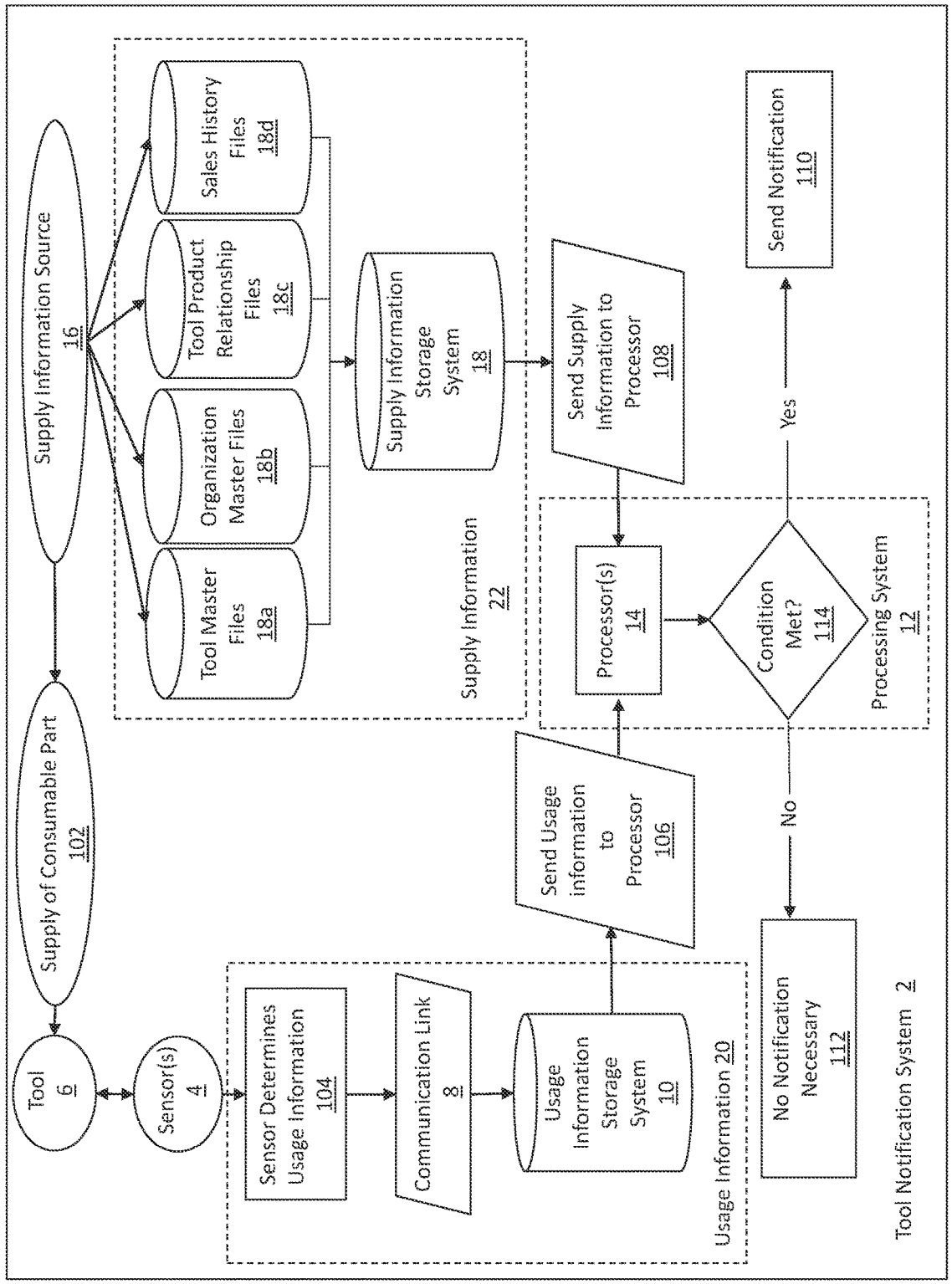
FIG. 3 illustrates an exemplary method for the tool notification system in accordance with FIG. 1.

Turning to FIG. 3, a flow chart depicting an exemplary operation of the exemplary tool notification system 2 is shown. As shown in FIG. 3, the source 16 may supply information, such as for example, the tool master files 18*a*, organization master files 18*b*, tool product relationship files 18*c*, and sales history files 18*d*, which may collectively make up the supply information storage system 18. The supply information 22 contained in the supply information storage system 18 is then sent in step 108 to the processor(s) 14. In exemplary embodiments, branching off source 16 in the opposite direction of the supply information 22 is step 102, in which the source 16 (e.g., company having the supply information 22) may supply consumable parts which are to be utilized by the tool 6. The sensor(s) 4 may be operatively coupled with the tool 6 to allow communication between the sensor(s) 4 and tool 6, indicated by the bi-directional arrow located between the sensor(s) 4 and tool 6. At step 104, the sensor(s) 4 detect usage by the tool and sends information about this usage as the usage information 20. The usage information 20 from the sensor(s) 4 is then sent via the communication link 8 to the usage information storage system 10. At step 106, the usage information 20 is sent to the processor(s) 14. At step 114, the processor(s) 14 compare the usage information 20 to the supply information 22 and determines when the comparison meets or exceeds a predetermined condition. As shown at step 110, if the predefined condition is met then a notification is sent. If the predefined condition is not met, then step 112 occurs and no notification may be necessary.

Figure 4:
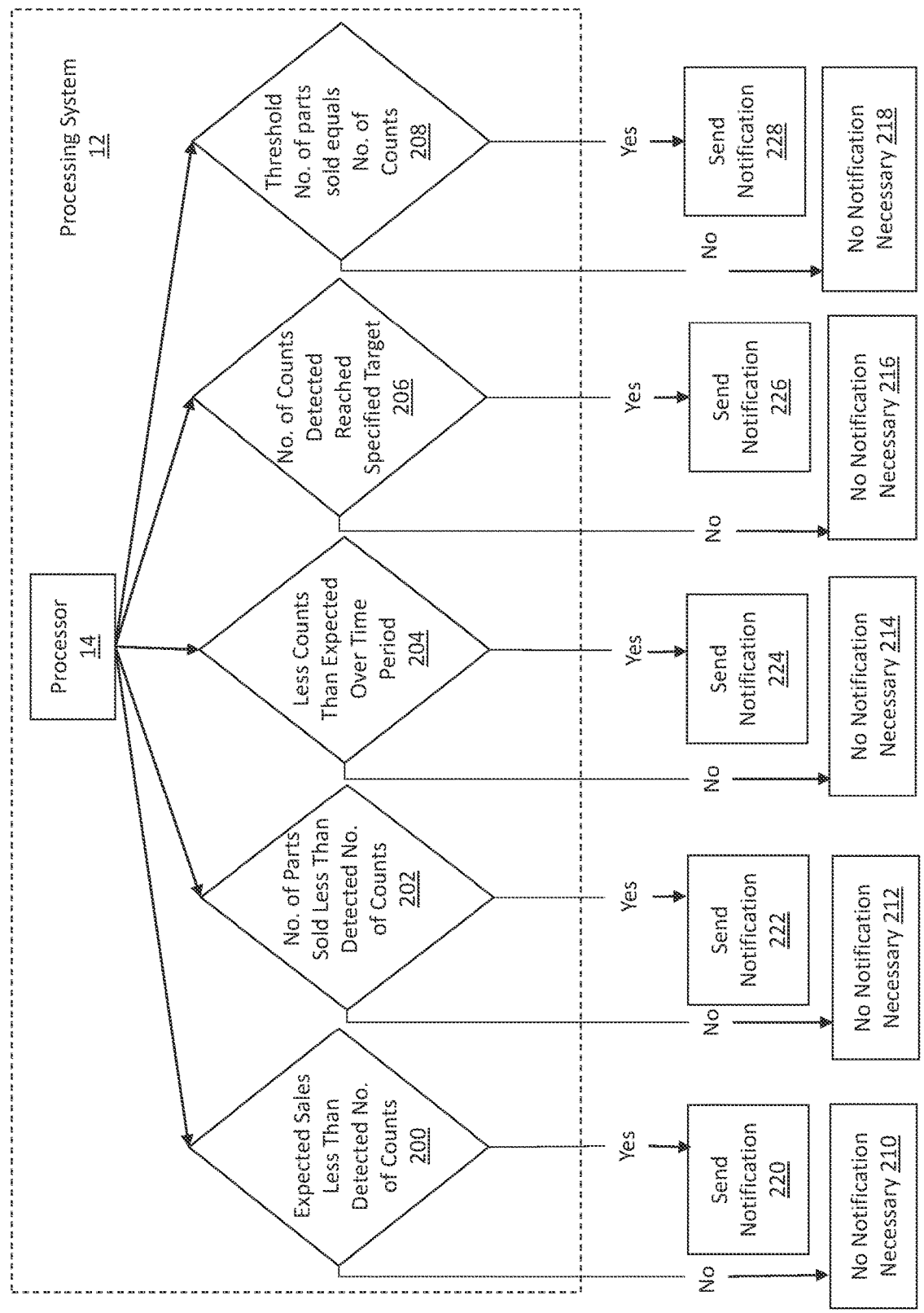
FIG. 4 illustrates an exemplary method with specific conditions that may be utilized in the tool notification system.

FIG. 4 is a diagram exemplifying several predetermined conditions and corresponding determinations that may be incorporated into the processor(s) 14. It will be appreciated that the predetermined condition used by the processor in may be any number of these predetermined conditions, or may include other conditions.

As shown at step 200, for example, the processor(s) 14 will compare sales data, supplied by the source 16 and stored in the supply information storage system 18 and sent into the processor(s) 14, to the number of counts or operations performed by the tool 6 detected by the sensor(s) 4, sent to the communication link 8, communicated to the usage information storage system 10, and input into processor(s) 14. If the expected number of sales (e.g., measured in a currency value) is less than a detected number of counts or operations expected to be performed at that number of sales, then step 220 may occur and the tool notification system 2 may send a notification. Alternatively, if this predetermined condition is not met, for example, if the expected number of sales, measured in a currency value, is greater than or equal to a detected number of counts or operations expected to be performed at that number of sales, then step 210 may occur and no notification may be necessary. Because the expected sales are less than a detected number of counts by the tool 6 expected to be performed at that number of sales, such information is indicative that the tool 6 is not being utilized properly. For example, if the detected number of operations performed is far greater than the number of sales, it may indicate that the tool 6 is being utilized for an unintended purpose. As a result, the notification sent in step 220 may allow appropriate action to prevent the tool 6 from being used for unintended purposes. Consequently, unwanted wear and tear on the tool 6 may be prevented. Accordingly, money and time may be saved not having to repair the tool 6 when used for consumable parts not intended.

As shown in step 202, the predetermined condition that may be incorporated into the processor(s) 14 compares the number of parts sold (e.g., measured in a quantity amount) supplied by the source 16, stored in the supply information storage system 18, and sent into the processor(s) 14, to the number of counts or operations performed by the tool 6 detected by the sensor(s) 4, sent to the communication link 8, communicated to the usage information storage system 10, and input into processor(s) 14. If the number of parts sold is less than the specified target number of detected counts or operations performed by the tool 6, then step 222 may occur and a notification may be sent. However, if the predetermined condition is not met, such as for example, if the number of parts sold is greater than or equal to the detected number of counts or operations performed by the tool 6, then step 212 occurs and no notification may be necessary. Because the specified target number of parts is less than a specified target number of detected counts this may be indicative that the tool 6 is not being utilized properly. For example, if the detected number of operations performed is far greater than the number of parts actually sold it may indicate that the tool 6 is being utilized for an unintended purpose. As a result, the notification sent in step 222 may allow appropriate action to prevent the tool 6 from being used for unintended purposes. As a result, unwanted wear and tear on the tool 6 may be prevented. Accordingly, money and time may be saved not having to repair the tool 6 when used for consumable parts not intended.

As shown in step 204, the predetermined condition that may be incorporated in the processor(s) 14 compares a specified target number of counts or operations to be performed over a period of time specified by the source 16, stored in the supply information storage system 18, and sent into the processor 14(s), to the detected number of counts or operations performed by the tool 6 detected by the sensor(s) 4, sent to the communication link 8, communicated to the usage information storage system 10, and input into processor(s) 14. If the detected number of counts or operations performed over a period of time is less than the specified target number of detected counts or operations performed by the tool 6 during the period of time, then step 224 may occur and a notification may be sent. However, if the predetermined condition is not met, such as for example, if the number of detected counts over a period of time is greater than the specified target number of detected counts or operations performed by the tool 6 during the period of time, then step 214 occurs and no notification may be necessary. Because the detected number of counts is less than expected over a period of time, this may indicate that the tool 6 is not being utilized a sufficient number of times. For example, if the specified target number of detected counts or operations to be performed over a period of time is set to zero by the source 16, and zero operations are performed over that time period, it may indicate that the tool 6 is not being utilized. Consequently, the notification sent in step 224 may allow action to either repurpose the tool 6 to be used more efficiently elsewhere or determine why the tool 6 is not being used and decide an appropriate solution. As a result, money may be saved by allowing the tool 6 to be sent elsewhere or repurposed, rather than staying stationary and unused for an extended period of time.

As shown in step 206, the predetermined condition that may be incorporated in the processor(s) 14 compares a specified target number of counts or operations specified by the source 16, stored in the supply information storage system 18, and sent into the processor(s) 14, to the number of counts or operations performed by the tool 6 detected by the sensor(s) 4, sent to the communication link 8, communicated to the usage information storage system 10, and input into processor(s) 14. If the specified target number of counts or operations to be performed is equal to the detected number of counts or operations performed by the tool 6 during the period of time, then step 226 may occur and a notification may be sent. However, if the predetermined condition is not met, such as for example, if the detected number of counts or operations performed is less than the specified target number of counts or operations to be performed by the tool 6, then step 216 occurs and no notification may be necessary. Because the specified target number of counts is reached, this may indicate that the tool 6 needs to be serviced. For example, if a specified target number of operations is performed, which typically may be determined through testing and experience in utilizing the tool 6, it may indicate that the tool 6 is becoming worn and parts may need replaced, such as for example, sensor, bearing, or any component in the tool 6. Continued use of the tool 6 after a specified target number of counts or operations performed by the tool 6 may result in preventable damage to the tool 6. As such the notification sent in step 216 will allow action to prevent harm and costly repairs to the tool 6.

As shown in step 208, the predetermined condition that may be incorporated in the processor(s) 14 compares a threshold number of parts sold supplied by the source 16, stored in the supply information storage system 18, and sent into the processor(s) 14, to the number of counts or operations performed by the tool 6 detected by the sensor(s) 4, sent to the communication link 8, communicated to the usage information storage system 10, and input into processor(s) 14. If the number of counts or operations performed meets the threshold number of parts sold, then step 228 may occur and a notification may be sent. However, if the predetermined condition is not met, such as for example, if the detected number of counts or operations performed is less than the threshold number of parts sold, then step 218 occurs and no notification may be necessary. Because the threshold number of parts sold equals the number of counts or operations performed, this may indicate that a replenishment of consumable parts for the tool 6 may be required soon. The notification sent in step 228 will allow action to replenish the consumable parts for the tool 6 prior to the consumable parts being depleted. Consequently, downtime may be minimized, and profits may be increased.

As shown in step 230, the predetermined condition that may be incorporated in the processor(s) 14 compares a time fence set by the source 16, stored in the supply information storage system 18, and sent into the processor(s) 14, to the time when the tool 6 is being used, output by the tool 6 or sensor(s) 4, sent to the communication link 8, communicated to the usage information storage system 10, and input into processor(s) 14. If the time the tool 6 is being used is outside of the restricted time fence, then step 232 may occur and a notification may be sent. Alternatively, if the predetermined condition is not met, such as for example, if the time that the tool 6 is being utilized is within the specified time fence, then step 234 may occur and no notification will be necessary. This is especially useful to prevent unauthorized use of the tool 6 after work hours, on weekends, or when there are no trained users on a work shift. It should be understood that once the notification is sent, it is possible that the notification be sent directly to the tool 6, and thus signaling the tool 6 to terminate operations to prevent unauthorized use.

The predetermined conditions that are referred to may be changed over time by the tool notification system 2. For example, through machine learning that discovers new predetermined conditions based on a comparison of the usage information 20, the supply information 22, or the like. Alternatively, the predetermined conditions may be changed manually by the user or owner of the tool 6. Regardless, if the predetermined condition is changed by the user, owner, or the tool notification system 2, the changed condition will accordingly still be considered a predetermined condition as described herein.

In addition to the predetermined conditions described herein, conditions can be further created based on patterns in the usage information 20, supply information 22, or the like. For example, the tool notification system 2, through the processor 14 may compare patterns in the usage information 20, such as for example, the number of counts performed by the tool 6 over a recent period of time to the number of counts performed by the tool 6 over a former period of time, and if the number of counts over the recent period of time is unexpected compared to that of the former period of time, the tool notification system 2 may send a notification. Additionally or alternatively, the tool notification system 2 may compare a combination of usage information 20 or supply information 22, such as for example, comparing a trend in the number of counts performed by tool 6 versus the number of sales over a recent period of time to the number of counts performed by tool 6 versus the number of sales over a former period of time, and if the pattern is unexpected compared to that of the former period of time, the tool notification system 2 may send a notification. This example may be particularly useful to suggest that the user of tool 6 is beginning to use unauthorized consumable parts with the tool 6. Furthermore, the tool notification system 2 may further be able to recognize patterns in the usage information 20, supply information 22, or the like between users with different tools all equipped with the tool notification system 2. To exemplify, if one user of a first tool 6 is buying large amounts of consumable parts compared to the usage of the first tool 6, and at the same time another user of a second tool 6 is not buying large amounts of consumable parts compared to the usage the second tool 6, a notification may be sent. This may be particularly helpful to indicate that the user of the first tool 6 may be hording the consumable parts associate with the first and second tool 6, which is resulting in the other user of the second tool 6 having to purchase consumable parts form an unauthorized source. It should be known that the patterns described herein, are not limited solely to the patterns explained and the patterns can be drawn from any combination of usage information 20, supply information 22, or the like.

Figure 5:
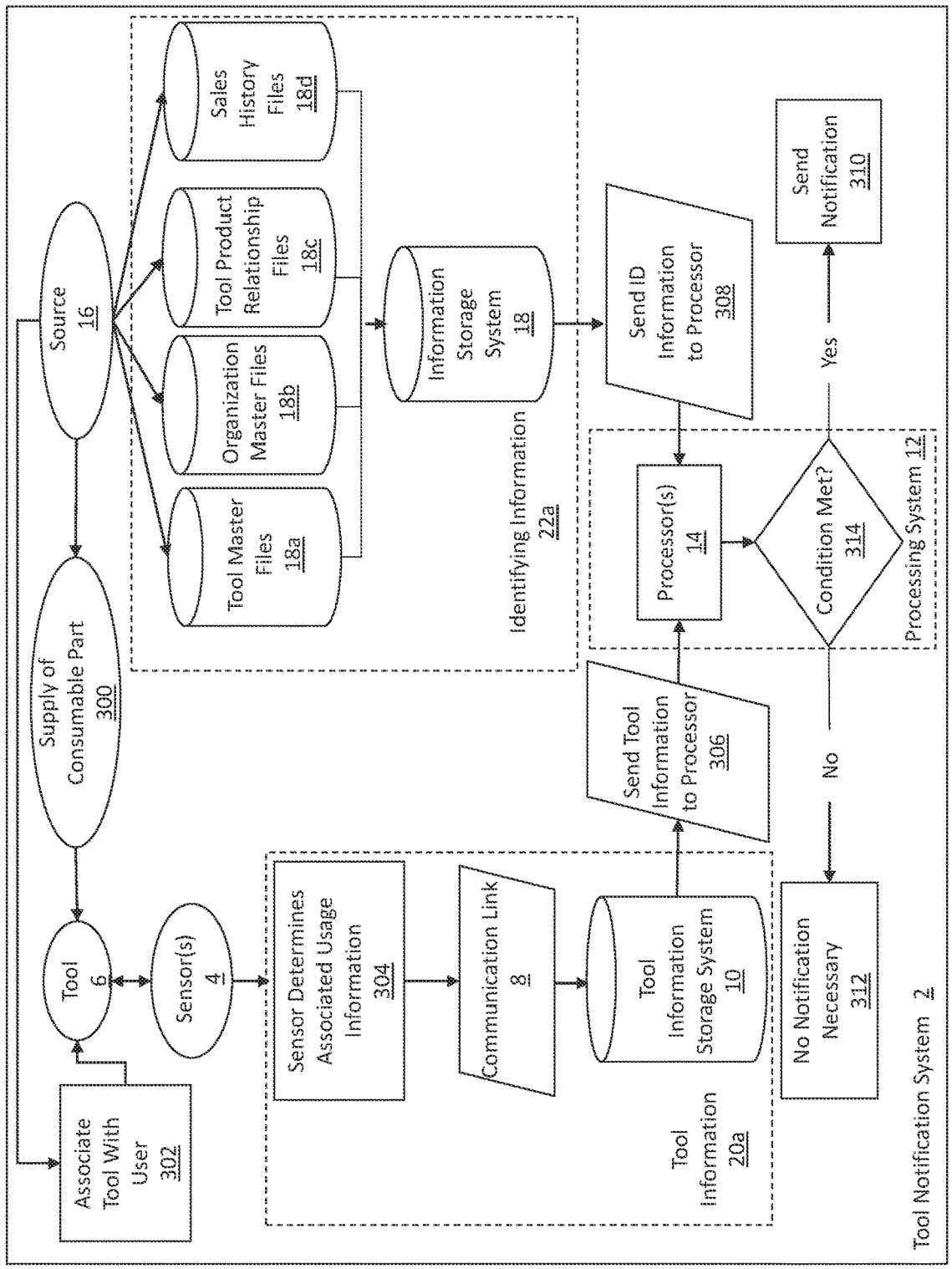
FIG. 5 illustrates an exemplary system of a tool notification system when the tool is associated with a specific user.
Figure 6:
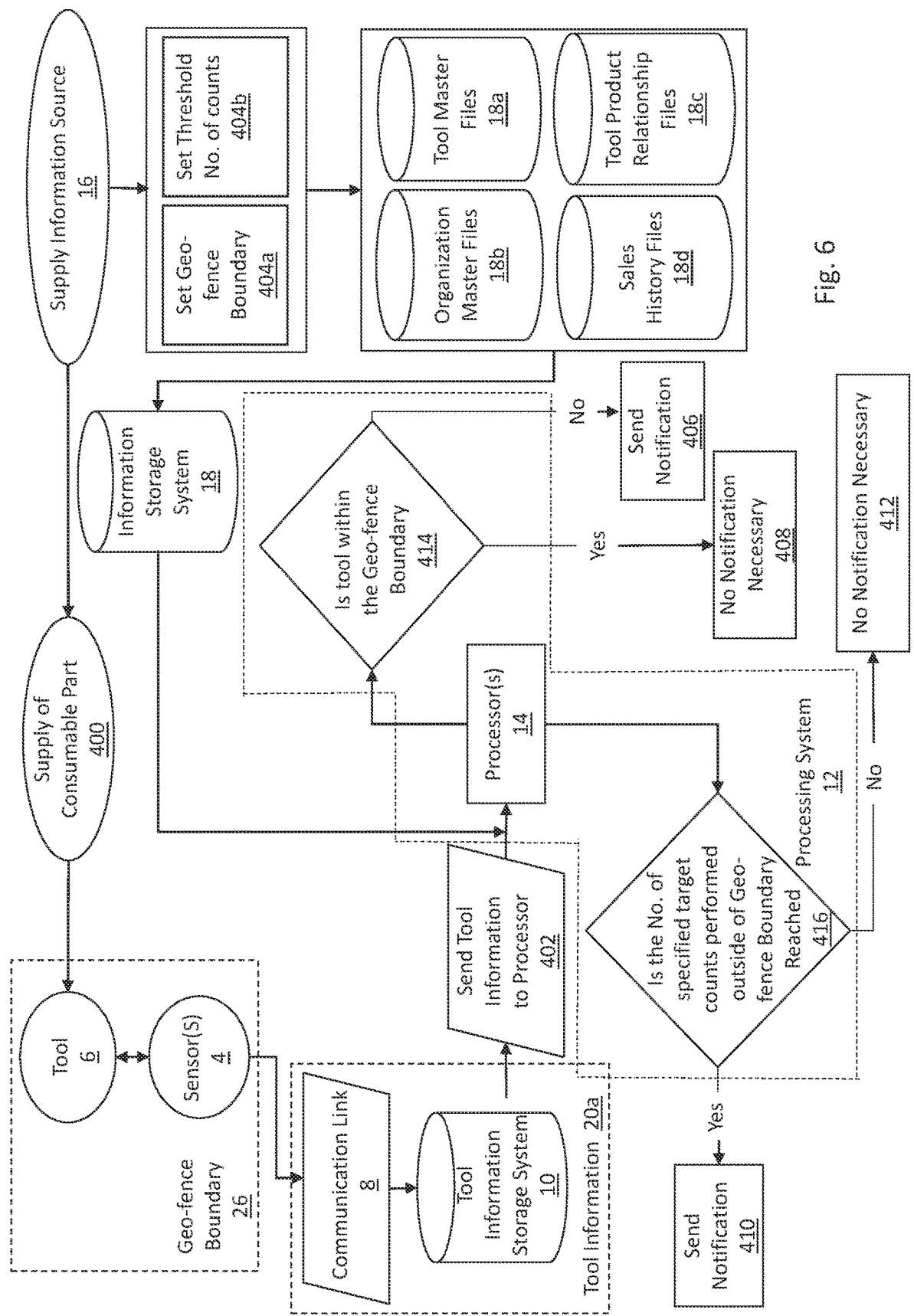
FIG. 6 illustrates an exemplary method for the tool notification system in accordance with FIG. 5.

Turning now to FIGS. 5 and 6, another exemplary embodiment of a tool notification system 2 is shown. The tool notification system 2 illustrated in FIGS. 5 and 6 is substantially the same as the above-described tool notification system 2 in FIGS. 1-4, and consequently the same reference numerals are used to denote structures corresponding to the same similar structures in the tool notification systems. In addition, the foregoing description of the tool notification system 2 in FIGS. 1-4 is equally applicable to the tool notification system 2 in FIGS. 5 and 6, except as noted below. Moreover, it is understood that aspects of the tool notification systems may be substituted for one another or used in conjunction with one another where applicable.

As shown in FIGS. 5 and 6, the tool notification system 2 includes a tool 6 associated with an identified party and at least one sensor 4 operatively coupled to the tool 6, in which the at least one sensor 4 is configured to detect at least one property associated with the tool. The system 2 also includes a communication link 8 operatively coupled to the tool 6 and configured to transmit tool information 20a associated with the at least one property detected by the at least one sensor 4. Also provided is a source 16 of identifying information 22a associated with identifying the identified party associated with the tool 6. As shown, the system 2 further includes a processing system 12 having at least one processor 14 that is configured to receive the tool information 20a from the tool 6 via the communication link 8, and is configured to receive the identifying information 22a from the source 16. The at least one processor 14 is configured to compare the tool information 20a to the identifying information 22a and determine when the comparison meets or exceeds a predetermined condition, and when the determination meets or exceeds the predetermined condition, the at least one processor is configured to send a notification.

As shown in this embodiment, the source 16 provides the identifying information 22a which may include supply information. For example, the identifying information 22a may include the tool master files 18a, organization master files 18b, tool product relationship files 18c, and sales history files 18d, which may collectively make up the information storage system 18, similarly to that described above. The identifying information 22a contained in the information storage system 18 is sent in step 308 to the processor(s) 14. Branching off source 16 in the opposite direction of the identifying information 22a is step 300, where the same source 16 that supplies the information 22a also may supply consumable parts to be utilized by the tool 6. In step 302, the tool 6 is associated with the user of the tool 6, such as for example, the tool 6 being associated with a user based on badge number, phone number, location, tool purchaser, tool lease agreement, tool load agreement, job work order, or the like. The sensor(s) 4 may be operatively coupled with the tool 6 to allow communication between the sensor 4 and tool 6 with its associated user, indicated by the bi-directional arrow located between the sensor 4 and tool 6. In step 304, the sensor 4 determines the associated tool information 20a. In the illustrated embodiment, the associated tool information 20a is sent via the communication link 8 to tool information storage system 10. In step 306, the tool information 20a is sent to the processor(s) 14. In step 314, the processor(s) 14 compare the tool information 20a to the identifying information 22a and determines if a predefined condition is met. If the predefined condition is met then step 310 occurs and a notification may be sent. If the predefined condition is not met, then step 312 occurs and no notification may be necessary.

Such a tool notification system 2 as shown in FIGS. 5 and 6 may have a number of useful applications. For example, because the tool 6 has an associated user (e.g., non-owner), this may allow the owner (e.g., distributor) of the tool 6 to determine from the comparison between the tool information 20a and the identifying information 22 whether the user of the tool 6 is likely the correct user of the tool 6.

FIG. 6 shows a more particular embodiment of the tool notification system 2 that utilizes a Geo-fence to be capable of sending a notification when the tool 6 associated with a user is outside of a given boundary. As shown in the illustrated embodiment, the source 16 may define the Geo-fence boundary shown in step 404a, which is stored in the information storage system 18 as identifying information 22a (e.g., the boundary is associated with the particular party having the tool. The Geo-fence boundary 26 may be any area around the tool 6 where the owner of the tool 6 seeks to prevent removal of the tool 6. For example, if the tool 6 is located in a manufacturing plant, the owner of the tool 6 may specify the Geo-fence boundary 26 to encompass the manufacturing plant. The area designated by source 16 as the Geo-fence boundary 26 is then sent from the supply information storage system 18 to the processor(s) 14.

Similarly to the foregoing embodiments described in connection with FIGS. 1-4, in step 400 the source 16 may supply consumable parts to be used with the tool 6, which such supply information associated with the consumable parts may form at least part of the identifying information 22a. The sensor(s) 4, in accordance with this particular embodiment, may include a Global Positioning System (GPS) sensor module, in which the sensor 4 is configured to output the location of the tool 6. The sensor 4 sends information about the location of the tool 6, in addition to other usage information 20 and/or 20a, via the communication link 8 as tool information 20a to the tool information storage system 10. Alternatively, such information may be sent directly to the processor(s) 14. The tool information 20a is not limited to location, but could encompass any data to allow the tool 6 to be associated with a user of the tool 6. For example, the tool information 20a may include usage information 20 described above in connection with the exemplary embodiment in FIGS. 1-4, thus tool information 20a may be a particular type of usage information 20.

As shown at step 402, the tool information 20a is sent to the processor(s) 14. With the Geo-fence boundary 26 set by a party, such as the source 16, and the location of the tool 6 output as tool information 20a, the processor(s) 14 can check to determine if the specified condition is met. For example, as shown at step 414, the processor(s) 14 determines if the tool 6 is located within the set Geo-fence boundary. If the condition in step 414 is satisfied, meaning that the tool 6 is located within the Geo-fence boundary, then no alert may be necessary. In contrast, if the tool 6 is not located within the specified boundary, the condition in step 414 has not been met and, as such, a notification may be sent. Such as system 2 may be useful to indicate that the user of the tool 6 has sent the tool 6 to a location where the tool 6 is not intended to be. This may allow the owner of the tool 6 to take appropriate action against the original authorized user of the tool 6 when the original user has allowed an unauthorized user to take control of the tool 6. The notification may be helpful to prevent unwanted use of the tool 6, for example resulting in unnecessary expenses caused by the wear and tear of the tool 6 when used by an unauthorized user or to prevent an authorized user from profiting off the tool 6 by leasing the tool 6 to an unauthorized user without permission from the tool owner. Additionally, it is understood that if either of the conditions has been met at step 416 or 414, the tool notification system 2 may send a notification directly to the tool 6, and thus signaling the tool 6 to terminate operations to prevent continued unauthorized use.

Still referring to FIG. 6, another example using a predetermined condition will now be described. In this embodiment, the sensor(s) 4, in addition to detecting the location of the tool 6 thorough a location sensor (e.g., GPS), also may a property associated with processing consumable parts (as described above), for example detecting the number of counts relative to the location of the tool 6. This tool information 20a is communicated from the sensor(s) 4 via the communication link 8 to the tool information storage system 10, which is sent to the processor(s) 14 in step 402. The processor(s) 14 may compare the tool information 20a with the Geo-fence boundary 26 in step 404a and the specified target number of counts (e.g., set by source 16) in step 404b, which may be stored as identifying information 22a in the information storage system 18. If the specified target number of counts or operations performed outside of the Geo-fence boundary is met, then step 410 will occur and a notification may be sent. For example, if the specified target number of specified counts is set to one, and if the tool 6 is outside of the Geo-fence boundary, then the tool notification system 2 would send a notification alerting that the tool 6 has been used outside of the Geo-fence boundary. In contrast, if the specified target number of counts or operations performed outside of the Geo-fence boundary is not met, then step 412 will occur and no notification may be necessary.

It is understood that the particular embodiment shown in FIG. 6 is not the only method according to the present disclosure of associating the tool 6 with a particular user. For example, as previously described, an owner of the tool 6 may require a user's name, identification number, which can be any form of identification such as an employee identification number, phone number, or the like to be input into the tool before use. If the association used when operating the tool 6, obtained by the tool 6 in communication with the sensor 4, does not match the information provided by the source 16 in the form of supply information 22, then a notification may be sent.

As noted above, the predetermined conditions that are referred to may be changed over time by the tool notification system 2. For example, through machine learning that discovers new predetermined conditions based on a comparison of the usage information 20 and/or tool information 20a, and the supply information 22 and/or identifying information 22a. Alternatively, the predetermined conditions may be changed manually by the user or owner of the tool 6. Regardless, if the predetermined condition is changed by the user, owner, or the tool notification system 2, the changed condition will accordingly still be considered a predetermined condition as described herein.

In addition to the predetermined conditions described herein, conditions can be further created based on patterns in the usage information 20, tool information 20a, supply information 22, and/or identifying information 22a. For example, the tool notification system 2, through the processor 14 may compare patterns in the usage information 20, such as for example, the number of counts performed by the tool 6 over a recent period of time to the number of counts performed by the tool 6 over a former period of time, and if the number of counts over the recent period of time is unexpected compared to that of the former period of time, the tool notification system 2 may send a notification. Additionally or alternatively, the tool notification system 2 may compare a combination of usage information 20 or supply information 22, such as for example, comparing a trend in the number of counts performed by tool 6 versus the number of sales over a recent period of time to the number of counts performed by tool 6 versus the number of sales over a former period of time, and if the pattern is unexpected compared to that of the former period of time, the tool notification system 2 may send a notification. This example may be particularly useful to suggest that the user of tool 6 is beginning to use unauthorized consumable parts with the tool 6. Furthermore, the tool notification system 2 may further be able to recognize patterns in the usage information 20, tool information 20a, supply information 22, and/or identifying information 22a between users with different tools all equipped with the tool notification system 2. To exemplify, if one user of a first tool 6 is buying large amounts of consumable parts compared to the usage of the first tool 6, and at the same time another user of a second tool 6 is not buying large amounts of consumable parts compared to the usage the second tool 6, a notification may be sent. This may be particularly helpful to indicate that the user of the first tool 6 may be hording the consumable parts associate with the first and second tool 6, which is resulting in the other user of the second tool 6 having to purchase consumable parts form an unauthorized source. It should be known that the patterns described herein, are not limited solely to the patterns explained and the patterns can be drawn from any combination of usage information 20, tool information 20a, supply information 22, and/or identifying information 22a.

Figure 7:
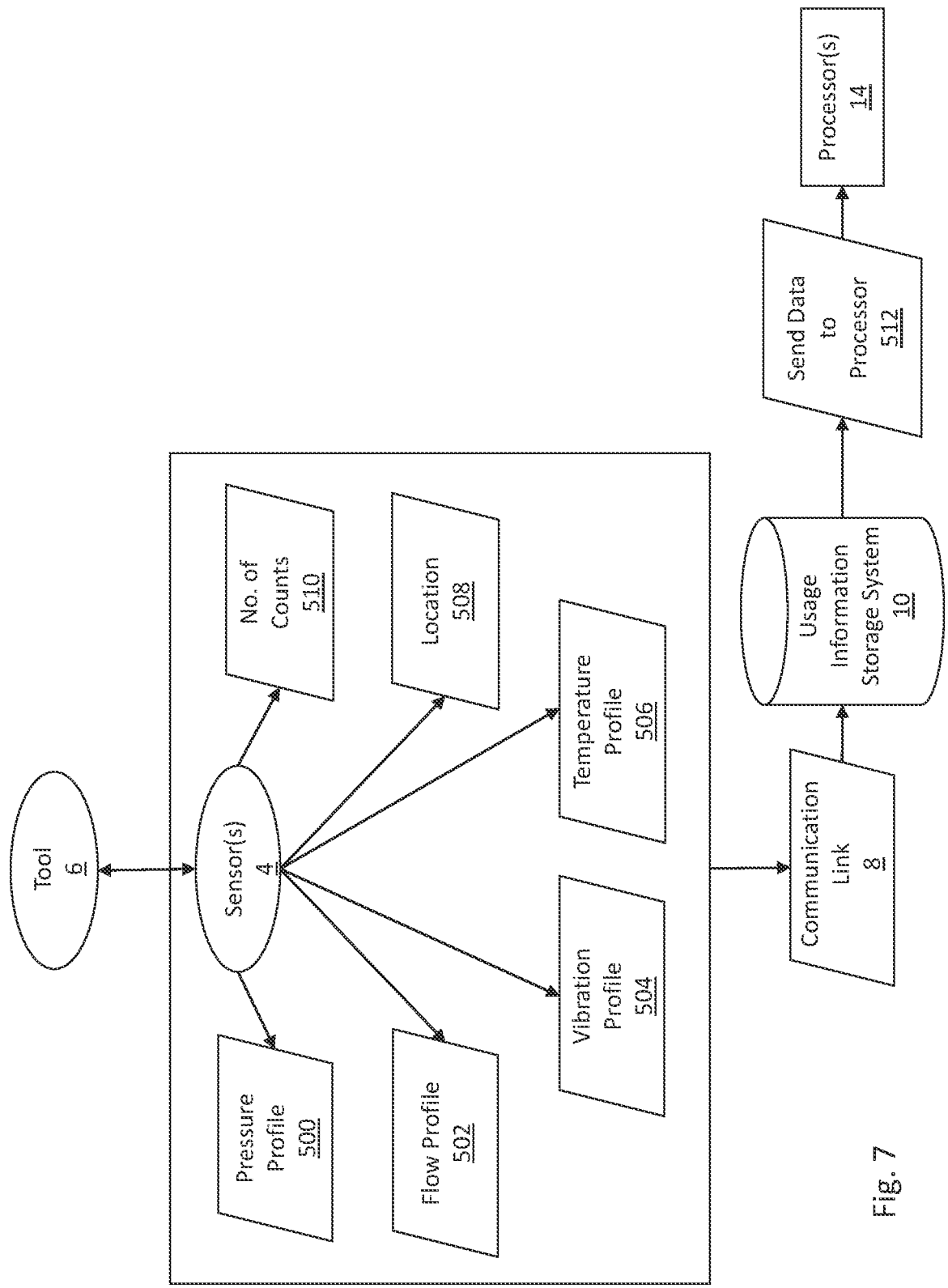
FIG. 7 illustrates exemplary sensor outputs in accordance with FIGS. 1, 3, 5, and 6.

Turning to FIG. 7, in accordance with the embodiment shown in FIGS. 1, 3, 5, and 6, exemplifies types of information that may be obtained from the tool 6 by way of the sensor(s) 4. It should be known that the information that can be obtained by the sensor(s) 4 is not limited to the information shown in FIG. 7. The information obtained from the tool 6 can be any information obtainable from the tool 6. Additionally, as previously mentioned the tool 6 is not limited to a single sensor 4 but may contain a plurality of different sensors. The sensor(s) 4 required by the tool 6 is determined based upon the correlations desired and the information required to draw said correlations, along with any additional information desired to be known about the tool 6. FIG. 7 depicts the tool 6 in communication with the sensor 4, where the sensor 4 may be a plurality of sensors. The sensor(s) 4, shown in FIG. 7 may be capable, for example, of determining pressure profiles shown in step 500, flow profiles shown in step 502, vibration profiles shown in step 504, temperature profiles shown in step 506, location shown in step 508, number of counts shown in step 510, and the like. This information in accordance with the previous embodiments shown in FIGS. 1, 3, 5, and 6, is then sent to the communication link 8, into the usage information storage system 10, and finally sent to the processor (s)14 via step 512 in FIG. 7. The profiles described herein may be utilized by the tool notification system 2 by comparing the profiles created from the usage information 20 output by the sensor(s) 4 to a known profile supplied by the source 16. For example, if a pressure profile is created from the usage information 20 output by the sensor(s) 4, and there is a known pressure profile supplied by the source 16 for the consumable part being used on the tool 6, the processor(s) 14 may compare the pressure profile created from the usage information 20 output by the sensor(s) 4 to the known profiled supplied by the source 16. If the known pressure profile is not the same/similar to the profile created from the usage information 20 output by the sensor(s) 4, it may indicate that poor parts are being created by the tool 6 or the tool 6 is not being used for its indented purpose. It should be understood that this comparison can be done for virtually any profile created from the usage information 20 output by the sensor(s) 4.

An exemplary tool notification system has been described herein. The tool notification system for determining tool usage information that would be otherwise unavailable or not easily discoverable by comparing information output by a tool and information obtained from a source. The tool notification system includes a tool operatively coupled to a sensor which may communicate information about the use, location, or other status of the tool to a processing system of the tool notification system. The processing system also receives the information from the source, which may include information about the parts supplied to the tool, the designated location of the tool, or other threshold parameters associated with supplying or using the tool. The processing system is configured to compare the information output from the tool and the information from the source and determine whether a condition is met for thereby sending a notification about unauthorized or inappropriate tool usage.

An aspect of the present disclosure provides, a tool notification system including: a tool configured to process consumable parts; at least one sensor operatively coupled to the tool, the at least one sensor configured to detect at least one property associated with using the tool to process the consumable parts; a communication link operatively coupled to the tool and configured to transmit usage information associated with the at least one property detected by the at least one sensor; a source of supply information associated with supplying the consumable parts for usage by the tool; and a processing system including at least one processor that is configured to receive the usage information from the tool via the communication link, and is configured to receive the supply information from the source; wherein the at least one processor of the processing system is configured to compare the usage information to the supply information and determine when the comparison meets or exceeds a predetermined condition, and when the comparison meets or exceeds the predetermined condition, the at least one processor is configured to send a notification.

Embodiments may include one or more of the following additional features, separately or in any combination.

In some embodiments, the at least one sensor includes a vibration sensor, a temperature sensor, a tool cycle count sensor, a pressure sensor, a Global Positioning System sensor, and/or a count sensor.

In some embodiments, the supply information includes tool master files, organization master files, tool product relationship files, sales history files, and/or geo-fence boundaries.

In some embodiments, the usage information includes pressure profiles, temperature profiles, flow profiles, vibration profiles, number of tool cycle counts, and/or location.

In some embodiments, the usage information includes detected number of tool cycle counts, and the supply information includes an expected number of consumable part sales, and wherein the processor is configured to determine when the expected number of consumable part sales are less than a detected number of tool cycle counts, wherein when the expected sales are less than the detected number of tool cycle counts a notification is sent to a party.

In some embodiments, the usage information includes detected number of tool cycle counts, and the supply information includes number of consumable parts sold to a party associated with the tool, and wherein the processor is configured to compare the detected number of tool cycle counts to the number of consumable parts sold to a party associated with the tool and determine when the number of consumable parts sold to a party associated with the tool is less than the detected number of tool cycle counts, and wherein when the number of consumable parts sold to a party associated with the tool is less than the detected number of tool cycle counts a notification is sent.

In some embodiments, the usage information includes detected number of tool cycle counts, and the supply information includes a specified target number of tool cycle counts performed over a specified duration of time, and wherein the processor is configured to determine when the detected number of tool cycle counts performed by the tool is less than the specified target number of tool cycle counts performed over a specified duration of time, wherein when the detected number of tool cycle counts performed by the tool is less than the specified target number of tool cycle counts performed over a specified duration of time a notification is sent.

In some embodiments, the usage information includes detected number of tool cycle counts, and the supply information includes a specified target number of tool cycle counts performed, and wherein the processor is configured to determine when the detected number of tool cycle counts performed by the tool reaches the specified target number of tool cycle counts performed, wherein when the detected number of cycle counts performed reaches the specified target number of cycle counts performed a notification is sent.

In some embodiments, the usage information includes detected number of tool cycle counts, and the supply information includes a threshold number of consumable parts sold, and wherein the processor is configured to determine when the threshold number of consumable parts sold equals the detected number of tool cycle counts, wherein when the threshold number of consumable parts sold equals the detected number of cycle counts a notification is sent.

Another aspect of the present disclosure provides, a method for determining tool usage information including detecting at least one property associated with using a tool to process consumable parts; providing a source of supply information associated with supplying the consumable parts for usage by the tool; comparing the usage information to the supply information and determining when the comparison meets or exceeds a predetermined condition; and sending a notification when the comparison meets or exceeds the predetermined condition.

Another aspect of the present disclosure provides, a tool notification system including: a tool associated with an identified party; at least one sensor operatively coupled to the tool, the at least one sensor configured to detect at least one property associated with the tool; a communication link operatively coupled to the tool and configured to transmit tool information associated with the at least one property detected by the at least one sensor; a source of identifying information associated with identifying the identified party associated with the tool; a processing system including at least one processor that is configured to receive the tool information from the tool via the communication link, and is configured to receive the identifying information from the source; wherein the at least one processor of the processing system is configured to compare the tool information to the identifying information and determine when the comparison meets or exceeds a predetermined condition, and when the comparison meets or exceeds the predetermined condition, the at least one processor is configured to send a notification.

Embodiments may include one or more of the following additional features, separately or in any combination.

In some embodiments, the tool is associated with an identified party through a predetermined Geo-fence boundary; wherein the tool information is location of the tool, and the identifying information is a Geo-fence boundary, and wherein if the location of the tool is outside of the Geo-fence boundary, a notification is sent.

In some embodiments, the tool is associated with an identified party through a user's identifications number.

In some embodiments, the user's identification number is a phone number; wherein the user's identification number is an employee identification number; wherein the user's identification number is a Service Set Identifier; wherein the user's identification number is a badge scan.

In some embodiments, the at least one sensor includes a vibration sensor, a temperature sensor, a tool cycle count sensor, a pressure sensor, a Global Positioning System sensor, and/or a count sensor.

In some embodiments, the identifying information includes tool master files, organization master files, tool product relationship files, sales history files, and/or geo-fence boundaries.

In some embodiments, the tool information includes pressure profiles, temperature profiles, flow profiles, vibration profiles, number of tool cycle counts, and/or location.

Another aspect of the present disclosure provides, a method for notifying of tool usage including: associating a tool with an identified party; detecting at least one property associated with the tool; providing a source of identifying information associated with identifying the identified party associated with the tool; comparing the tool information to the identifying information and determining when the comparison meets or exceeds a predetermined condition; and sending a notification when the comparison meets or exceeds the predetermined condition.

Another aspect of the present disclosure provides, a crimping system including: a crimping machine; and a sensor connected to the crimping machine including a pressure sensor, a Global Positioning System (GPS) module, and a cellular communication module.

Another aspect of the present disclosure provides, a method of using a crimping system including: providing a crimping machine and a sensor connected to the crimping machine including a pressure sensor, a Global Positioning System (GPS) module, and a cellular communication module; positioning the crimping machine and sensor at a business location; collecting real time operational and location data using the pressure sensor and GPS and relaying the data to the cloud via the cellular module; and downloading the data for viewing.

As described above, it is understood that embodiments of the subject matter described in this disclosure can be implemented in combination with digital electronic circuitry, controllers, processors, computer software, firmware, and/or hardware. For example, embodiments may be implemented in a tool notification system that uses one or more modules of computer program with instructions encoded on a non-transitory computer-readable medium for execution by, or to control the operation of, data processing apparatus. The operations may include physical manipulations of physical quantities such as electrical signals which may be controlled in a logic or the like.

It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of the foregoing.

The controller may include all apparatus, devices, and machines for processing data, including by way of example a programmable processor, a computer, or multiple processors or computers. The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment.

The processor may include all apparatus, devices, and machines suitable for the execution of a computer program, which may include, by way of example, both general and special purpose microprocessors, and any one or more processors of any kind of digital computer. Generally, the processor may receive instructions and data from a read-only memory or a random-access memory or both.

The computer may include, or be operatively coupled to receive data from or transfer data to, or both, one or more storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

To provide interaction with a user, embodiments may be implemented using a computer having a display device. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination thereof. The components of the system can be interconnected by any form digital data communication.

As used herein, an "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operably connected entities. An "operative connection," or a connection by which entities are "operatively connected," is one in which signals, physical communications, or logical communications may be sent or received. Typically, an operative connection includes a physical interface, an electrical interface, or a data interface, but it is to be noted that an operative connection may include differing combinations of these or other types of connections sufficient to allow operative control. For example, two entities can be operatively connected by being able to communicate signals to each other directly or through one or more intermediate entities like a processor, operating system, a logic, software, or other entity. Logical or physical communication channels can be used to create an operative connection.

As used herein, the phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A tool notification system comprising:
    a tool configured to process consumable parts;
    at least one sensor operatively coupled to the tool, the at least one sensor configured to detect at least one property associated with using the tool to process the consumable parts;
    a communication link operatively coupled to the tool and configured to transmit usage information associated with the at least one property detected by the at least one sensor;

a source of supply information associated with supplying the consumable parts for usage by the tool; and a processing system comprising at least one processor that is configured to receive the usage information from the tool via the communication link, and is configured to receive the supply information from the source;

wherein the at least one processor of the processing system is configured to compare the usage information to the supply information and determine when the comparison meets or exceeds a predetermined condition, and when the comparison meets or exceeds the predetermined condition, the at least one processor is configured to send a notification.

2. The tool notification system according to claim 1, wherein the at least one sensor includes a vibration sensor, a temperature sensor, a tool cycle count sensor, a pressure sensor, a Global Positioning System sensor, and/or a count sensor.

3. The tool notification system according to claim 1, wherein the supply information includes tool master files, organization master files, tool product relationship files, sales history files, and/or geo-fence boundaries.

4. The tool notification system according to claim 1, wherein the usage information includes pressure profiles, temperature profiles, flow profiles, vibration profiles, number of tool cycle counts, and/or location.

5. The tool notification system according to claim 1,
wherein the usage information includes detected number of tool cycle counts, and the supply information includes an expected number of consumable part sales, and
wherein the processor is configured to determine when the expected number of consumable part sales are less than a detected number of tool cycle counts, wherein when the expected sales are less than the detected number of tool cycle counts a notification is sent to a party.

6. The tool notification system according to claim 1,
wherein the usage information includes detected number of tool cycle counts, and the supply information includes number of consumable parts sold to a party associated with the tool, and
wherein the processor is configured to compare the detected number of tool cycle counts to the number of consumable parts sold to a party associated with the tool and determine when the number of consumable parts sold to a party associated with the tool is less than the detected number of tool cycle counts, and wherein when the number of consumable parts sold to a party associated with the tool is less than the detected number of tool cycle counts a notification is sent.

7. The tool notification system according to claim 1,
wherein the usage information includes detected number of tool cycle counts, and the supply information includes a specified target number of tool cycle counts performed over a specified duration of time, and
wherein the processor is configured to determine when the detected number of tool cycle counts performed by the tool is less than the specified target number of tool cycle counts performed over a specified duration of time, wherein when the detected number of tool cycle counts performed by the tool is less than the specified target number of tool cycle counts performed over a specified duration of time a notification is sent.

8. The tool notification system according to claim 1,
wherein the usage information includes detected number of tool cycle counts, and the supply information includes a specified target number of tool cycle counts performed, and
wherein the processor is configured to determine when the detected number of tool cycle counts performed by the tool reaches the specified target number of tool cycle counts performed, wherein when the detected number of cycle counts performed reaches the specified target number of cycle counts performed a notification is sent.

9. The tool notification system according to claim 1,
wherein the usage information includes detected number of tool cycle counts, and the supply information includes a threshold number of consumable parts sold, and
wherein the processor is configured to determine when the threshold number of consumable parts sold equals the detected number of tool cycle counts, wherein when the threshold number of consumable parts sold equals the detected number of cycle counts a notification is sent.

10. A crimping system comprising:
the tool notification system according to claim 1, wherein the tool is a crimping machine; and
a sensor connected to the crimping machine including a pressure sensor, a Global Positioning System (GPS) module, and a cellular communication module.

11. A method of using the crimping system according to claim 10, comprising:
providing the crimping machine and the sensor connected to the crimping machine including a pressure sensor, a Global Positioning System (GPS) module, and a cellular communication module;
positioning the crimping machine and sensor at a business location;
collecting real time operational and location data using the pressure sensor and GPS and relaying the data to the cloud via the cellular module; and
downloading the data for viewing.

12. A method for determining tool usage information comprising:
(i) providing a tool notification system comprising:
a tool configured to process consumable parts;
at least one sensor operatively coupled to the tool, the at least one sensor configured to detect at least one property associated with using the tool to process the consumable parts;
a communication link operatively coupled to the tool and configured to transmit usage information associated with the at least one property detected by the at least one sensor;
a source of supply information associated with supplying the consumable parts for usage by the tool; and
a processing system comprising at least one processor that is configured to receive the usage information from the tool via the communication link, and is configured to receive the supply information from the source;
wherein the at least one processor of the processing system is configured to compare the usage information to the supply information and determine when the comparison meets or exceeds a predetermined condition, and when the comparison meets or exceeds the predetermined condition, the at least one processor is configured to send a notification;
(ii) detecting at least one property associated with using the tool to process the consumable parts;

(iii) comparing the usage information to the supply information and determining when the comparison meets or exceeds the predetermined condition; and (iv) sending the notification when the comparison meets or exceeds the predetermined condition.

13. A tool notification system comprising:

a tool associated with an identified party;

at least one sensor operatively coupled to the tool, the at least one sensor configured to detect at least one property associated with the tool;

a communication link operatively coupled to the tool and configured to transmit tool information associated with the at least one property detected by the at least one sensor;

a source of identifying information associated with identifying the identified party associated with the tool;

a processing system comprising at least one processor that is configured to receive the tool information from the tool via the communication link, and is configured to receive the identifying information from the source;

wherein the at least one processor of the processing system is configured to compare the tool information to the identifying information and determine when the comparison meets or exceeds a predetermined condition, and when the comparison meets or exceeds the predetermined condition, the at least one processor is configured to send a notification.

14. The tool notification system according to claim 13, wherein the tool is associated with an identified party through a predetermined Geo-fence boundary;

wherein the tool information is location of the tool, and the identifying information is a Geo-fence boundary, and wherein if the location of the tool is outside of the Geo-fence boundary, a notification is sent.

15. The tool notification system according to claim 13, wherein the tool is associated with an identified party through a user's identifications number.

16. The tool notification system according to claim 15, wherein the users identification number is a phone number;

wherein the user's identification number is an employee identification number;

wherein the user's identification number is a Service Set Identifier;

wherein the user's identification number is a badge scan.

17. The tool notification system according to claim 13, wherein the at least one sensor includes a vibration sensor, a temperature sensor, a tool cycle count sensor, a pressure sensor, a Global Positioning System sensor, and/or a count sensor.

18. The tool notification system according to claim 13, wherein the identifying information includes tool master files, organization master files, tool product relationship files, sales history files, and/or geo-fence boundaries.

19. The tool notification system according to claim 13, wherein the tool information includes pressure profiles, temperature profiles, flow profiles, vibration profiles, number of tool cycle counts, and/or location.

20. A method of using the tool notification system according to claim 13 for notifying of tool usage comprising:

associating the tool with the identified party;

detecting the at least one property associated with the tool;

providing the source of identifying information associated with identifying the identified party associated with the tool;

comparing the tool information to the identifying information and determining when the comparison meets or exceeds a predetermined condition; and sending the notification when the comparison meets or exceeds the predetermined condition.

* * * * *